Jan. 20, 1970 G. I. PAYTON, JR 3,490,650
AUTOMOTIVE REFUELING SYSTEM
Filed May 9, 1967 2 Sheets-Sheet 1

INVENTOR
GLEN I. PAYTON, JR.
By Nilsson, Robbins & Anderson
ATTORNEYS

Jan. 20, 1970  G. I. PAYTON, JR  3,490,650
AUTOMOTIVE REFUELING SYSTEM
Filed May 9, 1967  2 Sheets-Sheet 2
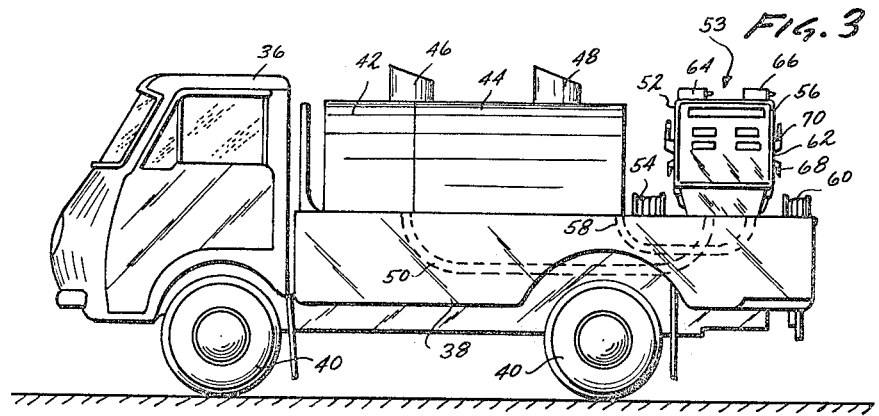
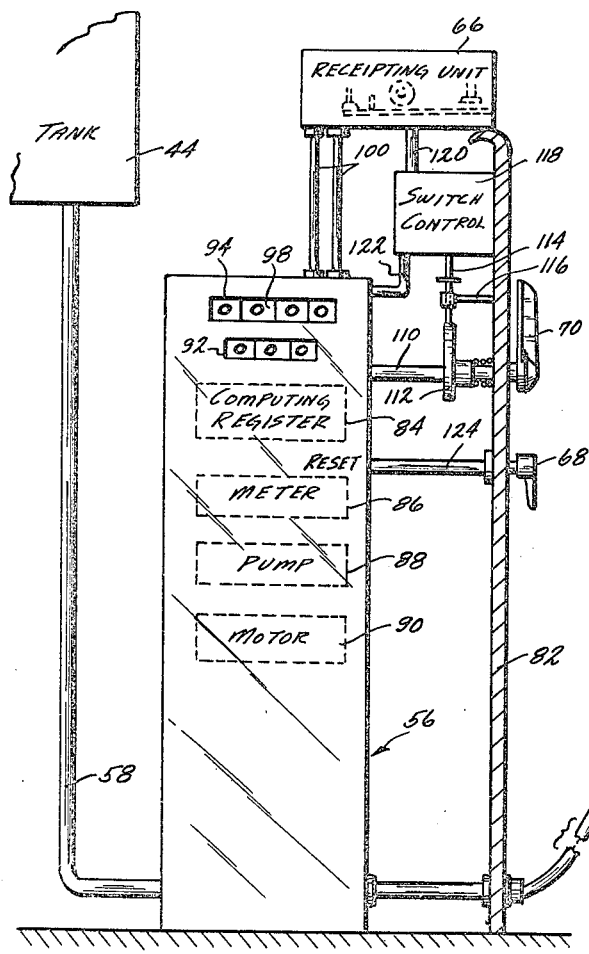
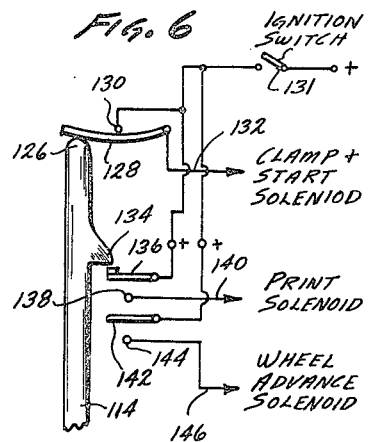
INVENTOR
GLEN I. PAYTON, JR.
ATTORNEYS

United States Patent Office 3,490,650
Patented Jan. 20, 1970

3,490,650
AUTOMOTIVE REFUELING SYSTEM
Glen I. Payton, Jr., 1336 Mokulua Drive,
Kailua Oahu, Hawaii 97634
Filed May 9, 1967, Ser. No. 637,189
Int. Cl. B67d 5/24
U.S. Cl. 222—30          6 Claims

ABSTRACT OF THE DISCLOSURE

A mobile unit incorporating at least one gas tank along with a dispensing apparatus for delivering discretely metered quantities of gasoline, as to automobiles. The metering apparatus includes structure for receiving a prepared purchase order slip and validating such a slip upon each and every discrete delivery, while concurrently providing a record of each discrete delivery. Certain safeguards are also incorporated in the system to avoid false or fraudulent deliveries from the system.

BACKGROUND OF THE INVENTION

Automotive service stations or gasoline filling stations as they are usually called, are among the most prominent of commercial establishments. They occupy some of the most valuable and active business property and they normally incorporate a relatively expensive structure constructed in a modern architectural style. As a result, filling stations are usually expensive to establish and operate. Yet, the highly-conventional mode in which the stations are operated is relatively inefficient and ineffective. As a preliminary observation in this regard, gasoline filling stations are normally situated so that paths of vehicular traffic intersect busy paths of pedestrian traffic. Current city planning studies have revealed the dangers and problems of such intersections, when they are unregulated and are located in congested areas as conventionally occupied by filling stations. On this basis alone, filling stations as conventionally operated represent an increasing hazard to life.

As a second independent consideration, nearly all automobiles frequently sit idle during prolonged periods. For example, a very large number of persons customarily drive an automobile to their place of employment, then park the automobile in a parking lot where it remains inactive for several hours. In such typical use of an automobile the driver must periodically take additional time to stop at a filling station and wait while his car is refueled and otherwise serviced. Clearly, the capability to service an automobile while it is temporarily stored on a parking lot, would save the automobile operator considerable time and trouble, and would also free a great deal of valuable commercial land (occupied by service stations) for other business purposes accommodating only pedestrian traffic.

The service of fueling automobiles in a parking lot has been proposed in the past. However, in general, prior offerings have involved parking-lot or other service personnel driving the automobiles to a gasoline dispensing pump and delivering a measured quantity of gasoline into the automobile. Thereafter, various methods have been employed to record and settle the resulting account with the automobile owner. Although, in the past service schemes of this type have met with some limited degree of success, their application has generally been limited to situations in which the automobile owner has complete faith and trust in the parking-lot service personnel. Of course, the relationship of trust is necessitated by the fact that the personnel not only operate the automobile independent of the owner, but furthermore by the fact that the owner is provided no positive evidence of the gasoline delivery into his automobile. As a result, as indicated, schemes of this type have been accepted only to a limited extent in rather special situations.

In analyzing the operation of effectively servicing, i.e. refueling, automobiles during a period of non-use, as when they are being temporarily stored on a parking lot, a number of desirable criteria have been determined. Specifically, the physical system, the method of its operation should not require an automobile owner to leave his automobile in an operative condition. That is, the automobile owner should be able to lock the ignition and the vehicle doors without interference to the refueling operation.

As another consideration, purchaser of gasoline should be provided with a receipted record of the delivery, as a delivery sheet. That is, within the reliability of contemporary mechanisms consumers are likely to accept deliveries as true and accurate providing certain requirements are established for their billing sheet. Specifically, for example, the purchaser of gasoline should be assured (within the reliability of available metering systems) that the quantity of gasoline for which he is being charged has actually been dispensed. The positive knowledge of that fact alone is a substantial barrier against fraudulent deliveries. Furthermore, a potential customer will more-readily accept a system if the mechanical structure necessitates that customer trust or faith, to any degree present, is between the customer and the responsible business authority selling the gasoline. That is, the purchaser of gasoline is not in a relationship of trust with personnel actually delivering the gasoline but rather the element of trust (to the degree necessary) exists between the purchaser and the sales company.

Recapitulating, the conventional techniques for selling and dispensing gasoline at the retail level are wasteful of time and property, and are inconvenient. However, alternative methods have not come into widespread use because of the lack of satisfactory physical systems (machines) for which a profound need exists.

SUMMARY OF THE INVENTION

In general, the system hereof enables the use of purchase-order slips (authorizing the delivery of gasoline to a customer's automobile) which are reliably receipted by the system to verify that the specified delivery was actually accomplished. Specifically, the system hereof may be embodied in a structure including a mobile vehicle and at least one gasoline tank from which gasoline can be metered by an incorporating apparatus. The metering apparatus also functions to receive a delivery slip during the metering operation and to print a quantitative measurement of each delivery on the slip whereby to provide a record that accounts for the operation of the mobile unit in the delivery of all dispensed gasoline. The system affords improved reliability in receipting prepared orders, or delivery slips, with the result that consumers may reasonably have faith and trust in the belief that they are receiving the gasoline for which they have paid. In this regard, a number of additional specific structural features are provided, including: the system accounts for each and every interval of operation during which a discrete quantity of gasoline may be dispensed; the system permits no tampering with the delivery slip during a discrete gasoline-dispensing interval; the system requires resetting the dispensing computer at the conclusion of the discrete interval of operation along with printing the measurement of the delivery, prior to initiating another discrete delivery; the system preserves a record of each and every disrete delivery; and the system does not permit selective printing apparatus to be made selectively inoperative.

BRIEF DESCRIPTION OF THE DRAWING

FIGURE 3 is a side elevation of a system incorporating the principles of the present invention;

FIGURE 4 is a somewhat sectional view of a portion of the structure of FIGURE 3;

FIGURE 6 is a diagrammatic view of an electrical unit within the structure of FIGURE 4.

DESCRIPTION OF THE PREFERRED EMBODIMENT

Figure 1:
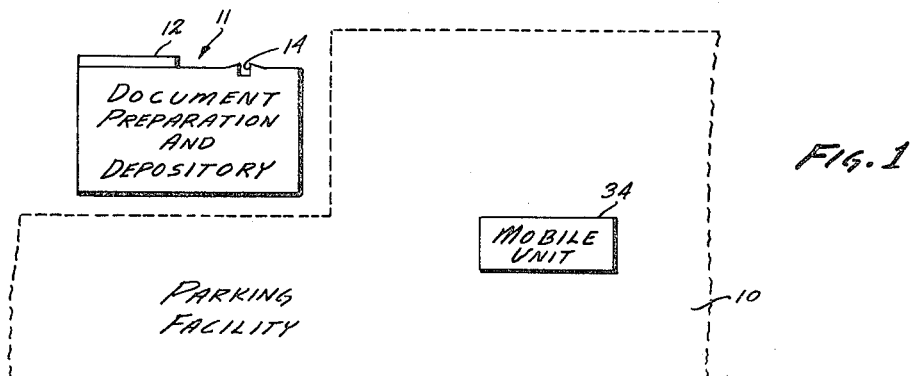
FIGURE 1 is a schematic diagram illustrative of the operating system hereof.

Referring initially to FIGURE 1, the general character and operation of the present system is illustrated. A parking facility 10 is shown, which may accommodate various numbers of automobiles and may for example be associated with a club, a shopping center, a factory, or may be an independent fee-charging parking lot. That is, in general, the parking facility 10 may comprise virtually any structure, lot or other storage location for automobiles.

At a location of convenience to persons using the parking facility 10, a station 11 is provided at which gasoline delivery authorizations, or order slips are prepared and deposited. The station 12 may be located at the pedestrian gate to the parking facility 10 and includes a preparation apparatus 12 and a depository 14. Specifically, the preparation apparatus 12 might comprise a structure for printing the identification letters of a plastic card (or other charge plate) on a blank order slip. Of course, a wide variety of such structure are very well known. The depository 14 may comprise simply a slotted strongbox into which orders may be deposited after they are printed and executed. In general, the depository is provided to afford greater confidence to customers by providing secure storage for open purchase orders; however, as the license number of the vehicle in which gasoline is to be placed is normally written upon the purchase order, little danger exists for misuse of the orders. Therefore, in some systems, the depository may be omitted in which case the customer can merely place the delivery slip on the automobile windshield.

Figure 2:
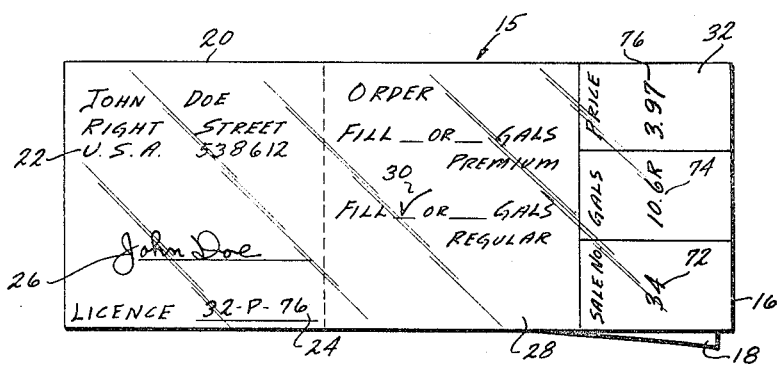
FIGURE 2 is a plan view of an order slip or receipting document as employed in the system hereof.

In accordance with the principles hereof, orders or delivery slips may be prepared in accordance with a multitude of different formats depending upon the characteristics of the particular system; however, exemplary of these formats is the order illustrated in FIGURE 2. The order comprises a paper package or slip 15 including an original sheet 16 and a duplicate sheet 18. The duplicate sheet 18 may be formed of pressure-sensitive paper or a carbon sheet may be disposed between the two sheets, depending upon the particular arrangement employed.

The slip 15 is divided into three major sections. The identification section 20 receives the imprinted identification letters 22 from the customer's card or the like, the handwritten designation 24 of the automobile license number, and the customer's authorizing signature 26. The order section 28 is printed to accommodate the customer's order of one of a plurality of gasolines either in a specific quantity or by the present contents of the automobile gasoline tank. The order is made simply by the select placement of a mark 30. The receipting section 32 of the slip 15 receives receipting printed designations of an actual gasoline delivery. The function of the section 32 is considered in more detail below; however, it is important at this point to understand that the characteristics of the system involve the authenticity of the data printed in section 32 as related to an actual gasoline delivery.

A supply of the slips 15 is located at the station 11 (FIGURE 1) and after parking his automobile a customer selects a blank slip 15 (FIGURE 2) and employs his credit card to print the letters 22, signs the slip with his signature 26, and writes the license number of his automobile as the designations 24. He designates his order by the mark 30, then deposits the slip in the slot of the depository 14 (FIGURE 1). His order is thus completed and will be processed by fueling his automobile prior to the time when he returns to use it.

Processing of the orders contained at the station 11 is accomplished by use of a mobile unit 34 as described in considerable detail below. In general, the mobile unit 34 comprises a gasoline-dispensing truck incorporating a metering unit which accounts for each discrete dispensing operation from the truck and additionally functions to receipt the order slips 15. The control afforded by the composite system of the mobile unit 34 permits the feasible use of the parking facility 10 as a gasoline filling station, avoiding the inconvenience, expense, and danger of prior conventional gasoline station facilities.

Considering the mobile unit 34 in detail, reference will initially be made to FIGURE 3 showing the combination incorporating a truck, tank facilities and integrated metering and marking apparatus for dispensing gasoline from the tank. Specifically, the system includes a cab 36 and a bed 38 supported on carriage incorporating wheels 40. A pair of tanks 42 and 44 are affixed on the bed 38 and are provided with saddles 46 and 48 respectively which contain relief vents, fill valves and so on. The forward tank 42 is connected through a duct 50 (shown in phantom) to a metering apparatus 52 for dispensing gasoline through a hose 54. Mounted in a single housing 53 with the metering apparatus 52 is another metering apparatus 56 which is connected through a duct 58 (shown in phantom) to the tank 44 and which serves to dispense gasoline through a hose 60. The hoses 54 and 60 are shown disposed on take-up reels as well known in the art.

The two metering apparatus 52 and 56 are similar and each may comprise a wide variety of different specific structures one form of which is disclosed below. Functionally, the metering apparatus delivers gasoline through an associated outlet hose from an associated tank, providing a visual presentation of the quantity dispensed on the metering face 62 both in volume and price. That is, windows are provided for each metering apparatus to reveal the volume of gasoline and the price thereof as it is dispensed during a discrete dispensing interval.

The metering apparatus 52 and 56 also individually incorporate receipting units 64 and 66 respectively which receive the prepared order slips (purchase authorization slips) to print indications of the quantity of gasoline actually dispensed in section 32 of the slip (FIGURE 2). The two receipting units 64 and 66 are similar in structure and in addition to printing the quantity and price of gasoline dispensed, they imprint a sequential mark on each delivery slip whereby to afford a composite total record of the operation of the mobile unit.

Considering the general operation of the mobile unit somewhat preliminarily after collecting the executed delivery slips (which may also specify the automobile location) the operator proceeds to an automobile that is to receive gasoline. Next, the operator resets the appropriate metering apparatus (if not done previously) by actuating a lever 68. That is, assuming the customer desires "regular" grade gasoline and that such gasoline is contained in the tank 44, the lever 68 is actuated to clear the metering apparatus 56. Next, the operator places the proper delivery slip 15 in the receipting unit 64 and actuates the operating lever 70 to an "on" position, which renders the metering apparatus operative. Of course, the specific metering apparatus may take a wide variety of different forms including gravity flow, mechanical spring pump, hand pump and electrical pump, as disclosed hereinafter. However, the lever 70 functions to initiate the dispensing operation and in this regard a latch arrangement exists between the levers 68 and 70, whereby the lever 70 cannot be actuated until the lever 68 has been actuated to clear the metering apparatus 56. On operating the lever 70, the delivery slip 15 in the receipting unit 66 is locked into place until the dispensing interval is concluded by moving the lever 70 to an "off" position.

The operator then dispenses the desired quantity of gasoline into the automobile after which the lever 70 is turned to "off" which stops the metering apparatus 56 and actuates the receipting unit 66 to imprint representations of the quantity of gasoline dispensed on the delivery slip. An identifying sale number is also printed on the slip.

The delivery slip which is locked into the receipting unit 66 during the dispensing interval is now released to be withdrawn as a record of the sale. In general, the duplicate sheet 18 (FIGURE 2) is taken by the operator as the company record of the sale while the original sheet 16 is left on the automobile for the customer's records. Normally, after a load of gasoline has been dispensed the operator will return to his station or depot to refill the tanks and turn in the duplicate copies of the delivery slips. Those slips will then provide the basis for rendering statements to customers as in the form of a monthly invoice.

It is to be noted, that the slips carry a positive indication of each sales number, the gallons dispensed, and the total price. Specifically, a sales number 72 (FIGURE 2) is recorded in the first box, an indication 74 of a specified number of gallons of regular gasoline, is indicated in the second box, and digits 76 indicative of a price are printed in a third box. The structure for imprinting the sale numbers, e.g. the number 72 along with the price and volume information is exceedingly important. That is, the structure which affords a composite record of the operation of the mobile apparatus plays significantly in the development of the requisite customer confidence. In this regard, each time a dispensing interval is concluded, the next-significant sale number in a predetermined order (numerically, for example) is automatically printed by the receipting unit. As a result, at the conclusion of an operating interval, the operator is responsible to deliver a plurality of individual record sheets in numerical sequence which tally an aggregate quantity of gasoline equal to the quantity of gasoline required to refill the tanks in his mobile unit and which bear consecutive sales numbers.

Although the use of the system hereof is described primarily in association with credit purchases, it will be evident that cash sales can be easily accommodated. In this regard, the customer simply places cash in an envelope having a format similar to the delivery slip and deposits it at the station 11 (FIGURE 1). The operator then makes a delivery just as explained above; however, in accounting his operations after a delivery run, he simply turns in an amount of cash equal to the total cash sales documented. Thus, the company is provided the basis for precise record of the gasoline dispensed and the individual sales with the result that fraudulent deliveries are unlikely. In this regard, usually customers are willing to accept the integrity of the company while there is considerable reluctance to accept the integrity of individual operators, particularly when no personal contact exists.

As indicated, the structures of the metering apparatus 52 and 56 and associated components are similar; therefore, only the metering apparatus 56 will be described in mechanical detail. As shown in FIGURE 4, the symbolically represented tank 44 is connected through the metering apparatus 56 to the hose 60 which terminates in a dispensing nozzle 80 as generally well known in the prior art. The dispensing unit 56, as shown incorporates a housing section 82 through which the control levers 68 and 70 extend. Structurally, the metering apparatus 56 includes a computing register 84, a fluid-flow meter 86, and may also incorporate a pump 88 driven by a motor 90. These units are integrally connected and accomplish a visual presentation through a window 92 indicative of the number of gallons dispensed during an interval of operation and through a window 94 indicative of the cost thereof. The meter settings presented through the windows 92 and 94 are also provided on printing wheels contained in the receipting unit 66. That is, as generally well known in the prior art, a plurality of meter wheels are mounted behind the windows 92 and 94 to manifest various designations in accordance with the operation of the unit. Also as well known in the prior art, a set of printing wheels contained in the receipting unit 66 are concomitantly operated thereby setting type, to print, coincident with the visual presentation through the windows 92 and 94.

As indicated, a wide variety of different forms of the metering apparatus 56 may be employed. For example, the register-meter-pump-motor combination may be as disclosed in U.S. Patent 2,660,335, Bliss, et al. In that structure, metering apparatus 56, whereby the handle 70 may not be actuated to initiate a dispensing interval until the lever 68 is actuated to reset the indicating wheels displayed through the windows 92 and 94.

Of course various structures may be employed to set and reset the register indicating wheels along with the printing wheels as considered below, and one such structure is shown and described in U.S. Patent 2,814,444, Bliss.

In the system as shown in FIGURE 4, the visual display wheels 98 are mechanically coupled through linkages 100 to print wheels (not shown in FIGURE 4) contained in the receipting unit 66.

In operation, the system is manually controlled by the lever 70 which is carried on a shaft 110 coupled to the metering apparatus 56 and which carries a cam 112 that engages a cam-following rod 114 slidably supported in a bearing 116 affixed to the interior of the housing section 82. The rod 114 extends into a switch control unit 118 affording electrical control to the receipting unit 66 and the metering apparatus 56 through electrical cables 120 and 122 respectively. The operation of the lever 70 to actuate the metering apparatus 56 through the shaft 110, and the interlock with the reset lever 68 (through the shaft 124) is disclosed in detail in U.S. Patent 3,178,057, Nelson, which structure is satisfactory as a component for incorporation in systems constructed in accordance with the present invention.

More detailed consideration will now be given to the exemplary structure of the switch control unit 118 and the receipting unit 66. In this regard, it is to be emphasized that the receipting unit 66 is in locked engagement with the metering apparatus 56 through the linkages 100 and all such hardware is in accessibly contained within the housing 82. As a result, each and every dispensing operation of the metering apparatus 56 is translated to the receipting unit 66 and advances the sales number.

First, consider the generation of sequence control signals in the unit 118. Within the switch control unit 118, the rod 114 actuates certain switches (symbolically represented in FIGURE 6) during operation of the handle 70. Specifically, the rod 114 is shown in an intermediate position between its raised and lowered position. As the rod is cam-actuated further upwardly the end 126 thereof further drives a contact leaf 128 into electrical contact with a terminal 130 which is connected to a source of electrical energy (along with the other switches in the unit) through a switch 131 that is closed only when the ignition of the vehicle in the cab 36 is turned off. Therefore, when the leaf 128 contacts the terminal 130, electrical energy appears in a conductor 132 which acts as a control signal and initiates the dispensing interval by energizing the motor 90 as disclosed in the above referenced patent.

During the return, or downward stroke, the rod 114 carries an abuttment 134 which drives a leaf 136 into electrical contact with the terminal 138. As a result, a conductor 140 is energized for driving the printer in the receipting unit, to actually receipt the delivery slip. Continued movement of the rod 126 in a downward direction disengages the leaf 128 from the terminal 130, then brings the abutment 134 into engagement with a leaf 142, to move the leaf into electrical contact with the terminal 144 energizing the conductor 146 with a current that advances a print wheel to tally the sale. The actual operations commanded by these electrical signals as they appear in the conductors 132, 140 and 146 are performed within the receipting unit 166 (FIGURE 4), by apparatus as shown in detail in FIGURES 5 and 7.

The delivery sheets or slips 15 are provided through a slot 148 (FIGURE 5) into the receipting unit 66 to lie on a pivotally mounted platform 150 affixed to the housing section 82 by a hinge 152. The free or swinging end of the platform 150 is affixed to the armature 154 of a solenoid coil 156 by a pivotal coupling 158. The solenoid coil 156 is energized through the conductor 140 to raise the platform 150 into printing engagement with a series of print wheels 159 as individually described below. At the conclusion of each discrete delivery interval the solenoid coil 160 is actuated through the conductor 146 by a control signal from the control switch 118 to step a ratchet 162 advancing the sale number print wheel 161.

Figure 7:
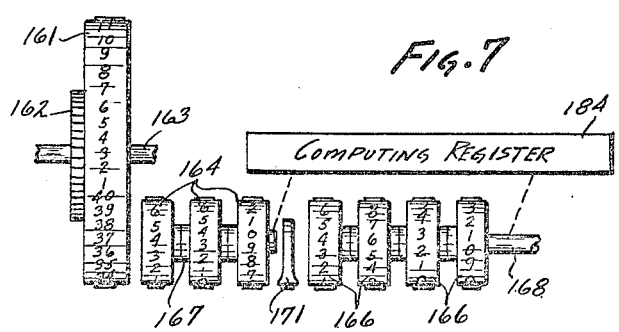
FIGURE 7 is a side and diagrammatic view of a portion of the structure of FIGURE 5.

The sale number print wheel 161 is also shown in FIGURE 7 carried on a shaft 163 for free movement by the ratchet 162. As shown, the volume print wheels 164 and the price print wheels 166 are mounted in axial alignment with the wheel 161 and are carried on shafts 167 and 168 respectively. These shafts may comprise concentric telescopic shafts as well known in the prior art and are connected (as indicated) to the computing register 84, indicated as a block in FIGURE 7. The mechanical connection from the computing register 84 maintains the wheels 164 and 166 displaced in exact relationship to the indicating wheels in the computing register. However, the sale-number wheel 161 is independent of the computing register and advances by operation of the solenoid 160 at the close of each discrete dispensing operation. It is that structure which affords a positive record (by the delivery-slip duplicates) which manifests any gap or hiatus in the sequence of discrete operating intervals. Specifically, if an operator does not turn in a record of one of the sales, or if he actuates an operating interval without a purchase slip in the unit, the possibly-fraudulent occurrence is indicated by the absence of a delivery-slip duplicate bearing a specific sales number. Thus, a continuous sequential record of discrete sales is provided.

In addition to printing the purchase volume, price, and sales number, the type of gasoline is indicated as a code designation, e.g. the letter R for regular. This indication is printed by a fixed print tab 171 bearing a single letter of type and serves not only to identify the gasoline delivered, but also to distinguish the sales slips for the two metering systems.

During the printing operation, and in fact, during the full delivery interval, the delivery slip 15 is locked in position within the receipting unit 66 (FIGURE 5) by an electrical clamp 164 bearing a cushion pad 166. The clamp 164 comprises the armature of a solenoid 168 which is driven downwardly upon receipt of an energizing current through a conductor 132.

In view of the above structural description of the various components and operating elements of the system illustratively described herein, a full understanding of the total system may now be best provided by considering a sequence of operational steps in order. Therefore, assume a customer has parked his automobile in the parking facility 10 (FIGURE 1) and desires to have his automobile filled with gasoline. He proceeds to the physical location of the document preparation and depository station 11, where he prepares and deposits a delivery slip or purchase order. Specifically, from a supply of blank forms, the customer employs his embossed credit card for example in cooperation with the printer apparatus 12 to mark the letters 22 (FIGURE 2) on the slip 15. Next, the customer executes his signature 26, fills in his license designation 24 and makes a mark 30 to indicate his automobile is to be filled with regular gasoline. Thereafter, the customer deposits the prepared slip 15 through the slot 14 (FIGURE 1) of the depository, and proceeds with his other activities without giving the matter further concern.

Figure 5:
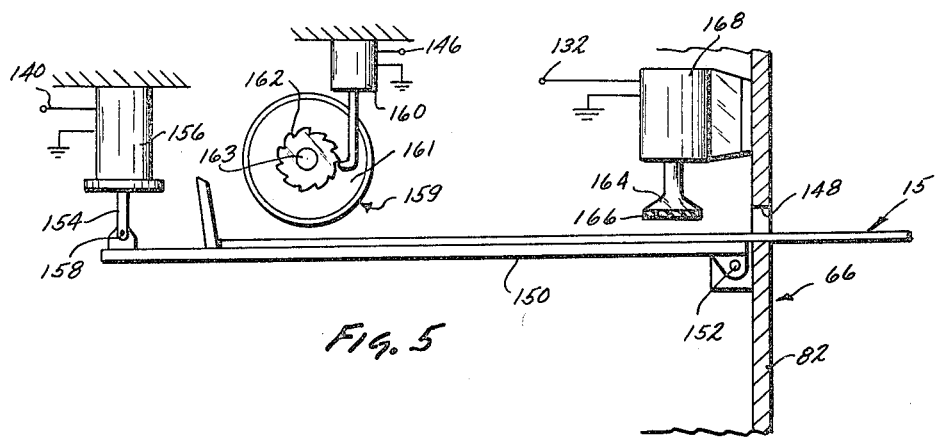
FIGURE 5 is an enlarged vertical sectional view of a portion of the structure of FIGURE 4.

Thereafter, the operator of the mobile unit 34 (FIGURE 1) withdraws the prepared slip 15 (with others) and in due course drives the mobile unit 34 to the location of the customer's automobile as identified by the license number designation 24. Upon arriving at the location of the automobile, the operator of the mobile unit stops and turns off the engine to leave the cab 36. Then, he places the customer's prepared purchase slip 15 into the receiptinfi unit 66 (FIGURE 5). If not previously actuated, the operator next actuates the reset lever 68 to clear the computing register 84 of a prior transaction, he then actuates the lever 70 to initiate the period of delivery.

The actuation of the lever 70 moves the cam 112 (FIGURE 4) lifting the rod 114 (FIGURE 6) and engaging the leaf 128 to the terminal 30 to provide a current in the conductor 132 that will energize the coil 168 (FIGURE 5). As a result, the clamp 164 is moved downward setting the pad 66 on the delivery slip 15 so that the delivery slip may not be drawn from the slot 148 without mutilation. It is to be noted that these operations are performed in a somewhat-mandatory sequence, allowing the operator little or no deviation which might permit fraudulent receipting of the delivery slip 15.

With the delivery slip 15 held in the receipting unit 66 and the metering apparatus operative the operator proceeds to dispense a metered amount of gasoline through the hose 60 and the nozzle 80 (FIGURE 4). In the exemplary instance, the automobile is filled with gasoline which requires 10.6 gallons of gasoline at the total cost of $3.97. As a result, indicating wheels 98 and the print wheels 159 (FIGURE 6) are set to indicate that quantity of gasoline and the associated price.

Continuing with his pattern of operation, the operator next actuates the lever 70 (FIGURE 4) to conclude the discrete interval of the gasoline delivery. As a result, the rod 114 (FIGURE 6) is lowered in turn actuating the electrical contact leaves 136 and 142 in sequence to energize the electrical conductors 140 and 146. Upon energization of the conductor 140, the coil 156 actuates the armature 154 drawing the slip-carrying table 150 upward so that the print wheels 159 print the designations in section 32 of the delivery slip 15. Specifically, the sales number (34) the gallons of gasoline (10.6) the type of gasoline (R) and the price (3.97) are printed. Thereafter, the energization of the conductor 146 actuates the solenoid coil 160 (FIGURE 5) to advance the transaction print wheel by means of the ratchet 162. Thus, the concluding transaction is tallied by the advance of the sale-number print wheel, preparatory to the next transaction. The cycle of operation is then repeated until the orders are all processed or the gas load is dispensed. Thereupon the operator returns to his depot for an accounting that, in view of the record provided by the duplicate slips, is exceedingly simple and reliable. As indicated above, the duplicate delivery slips representing credit sales then form the basis of billing individual purchases substantially in the manner now widely practiced.

It may therefore be seen that the system hereof affords a basis for operating an improved system of gasoline delivery and sale, wherein the structure tends to establish honest delivery. Of course, devious techniques might be employed to fraudulently operate the apparatus; however, the safeguards hereof are deemed minimally sufficient to establish customer confidence if the housing 82 of the metering apparatus is secure against tampering by an operator. Recapitulating a gasoline delivery may not be initiated until the prior contents of the computer register has been cleared. The gasoline delivery or discrete interval of delivery is given an assigned tally number by the system which number appears on both the customer's record and the company's record, along with the quantity of gasoline dispensed during the interval. Of course, various other safeguards may also be incorporated and added to the basic system hereof; therefore, this system is not to be interpreted in accordance with the specific form disclosed but rather the breadth of the invention shall be determined by the claims as set forth below.

What is claimed is:

1. A mobile unit for dispensing discrete quantities of gasoline or the like, as to automobiles, and receipting a delivery slip in accordance with an order written thereon, comprising:
    a mobile truck vehicle including an ignition switch;
    at least one gasoline tank mounted on said vehicle for containing a quantity of gasoline;
    means for metering gasoline from said tank whereby to deliver gasoline into said automobile or the like;
    marking means connected to be controlled by said means for metering, for making indications of discrete amounts of gasoline dispensed by said means for metering, said marking means being in locked engagement with said means for metering whereby each discrete quantity of gasoline dispensed from said tank is accounted for by displacement of said marking means;
    control means to receive said delivery slip and for actuating said marking means to print said indications on said slip, said control means including means to lock said delivery slip therein during an interval while gasoline may be dispensed from said tank; and
    means for conditioning said means for metering to operate only when said ignition switch is open.

2. A mobile unit in accordance with claim 1, wherein said marking means further includes printing means for printing a number on said delivery slip to identify the sale manifest by said delivery slip in a predetermined sequence.

3. A system according to claim 1 wherein said means for metering gasoline from said tank includes a pump structure for forceably urging gasoline through said means for metering.

4. A mobile unit according to claim 1 wherein a plurality of tanks are included and wherein said marking means includes means for marking said delivery slip to indicate the particular one of said tanks from which gasoline is metered during each particular interval of use.

5. A mobile unit in accordance with claim 1 wherein said marking means comprises a plurality of rotary print wheels connected to be controlled by said means for metering, whereby to make indications of discrete amounts of gasoline dispensed, unit price therefor and sale number in a particular sequence.

6. A mobile unit in accordance with claim 1, wherein said means for metering, and said control means incorporate electrically-driven components and wherein said means for conditioning controls said components for energization only when said ignition switch is in an open state.

References Cited

UNITED STATES PATENTS

| | | | |
|---|---|---|---|
| 1,875,119 | 8/1932 | Ohmer et al. | 222—30 X |
| 3,021,032 | 2/1962 | Swank | 222—30 |
| 3,021,982 | 2/1962 | Robinson | 222—30 |
| 3,069,052 | 12/1962 | Martin | 222—30 |
| 3,214,763 | 10/1965 | Davis | 222—30 X |
| 3,257,031 | 6/1966 | Dietz | 222—135 X |
| 3,366,967 | 1/1968 | Sherman et al. | 222—30 X |

SAMUEL F. COLEMAN, Primary Examiner

F. R. HANDREN, Assistant Examiner

U.S. Cl. X.R.

222—135